US008797903B2

(12) United States Patent
Chin et al.

(10) Patent No.: US 8,797,903 B2
(45) Date of Patent: Aug. 5, 2014

(54) METHOD AND APPARATUS OF UTILIZING UPLINK SYNCHRONIZATION SHIFT COMMAND BITS IN TD-SCDMA UPLINK TRANSMISSION

(75) Inventors: Tom Chin, San Diego, CA (US); Guangming Shi, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 195 days.

(21) Appl. No.: 13/505,437

(22) PCT Filed: Mar. 22, 2010

(86) PCT No.: PCT/US2010/028190
§ 371 (c)(1),
(2), (4) Date: Jul. 17, 2012

(87) PCT Pub. No.: WO2011/068554
PCT Pub. Date: Jun. 9, 2011

(65) Prior Publication Data
US 2012/0275437 A1    Nov. 1, 2012

Related U.S. Application Data

(60) Provisional application No. 61/265,514, filed on Dec. 1, 2009.

(51) Int. Cl.
*G08C 15/00* (2006.01)
*H04J 3/00* (2006.01)
*H04L 12/43* (2006.01)
*H04W 56/00* (2009.01)
*H04W 52/58* (2009.01)
*H04W 72/04* (2009.01)
*H04W 52/14* (2009.01)

(52) U.S. Cl.
CPC ...... *H04W 56/0005* (2013.01); *H04W 72/0406* (2013.01); *H04W 52/143* (2013.01); *H04W 52/58* (2013.01)
USPC ............ 370/252; 370/254; 370/345; 370/458

(58) Field of Classification Search
None
See application file for complete search history.

(56) References Cited

U.S. PATENT DOCUMENTS

2004/0052236 A1* 3/2004 Hwang et al. ............... 370/342
2008/0144600 A1* 6/2008 Anderson ................... 370/350
2009/0040999 A1* 2/2009 Yuk ............................. 370/345

OTHER PUBLICATIONS

3GPP Group Radio Access Network: "Physical channels and mapping of transport channelsonto physical channels (TDD) (Release 8)", 3rd Generation Partnership Project (3GPP); Technicalspecification (TS), XX, XX, TS 25.221, V8.6.0, Sep. 1, 2009, pp. 57-99, XP002591595.
Chapter 5.2: "UL Synchronisation" In: 3GPP RAN: "3GPP TS 25.224 V8.5.0", Sep. 1, 2009, 3GPP, XP002591335, pp. 40-42.
Dahlmann, E et al., "3GEvolution: HSPA and LTE for Mobile Broadband, passage", Jun. 1, 2008, 3G Evolution : HSPA and LTE for Mobile Broadband, Academic Press in Elsevier, NL, pp. 490-495, XP002591334, ISBN: 978-0-12-374538-5 paragraph [19.5].

(Continued)

*Primary Examiner* — Ashley Shivers
(74) *Attorney, Agent, or Firm* — Kristine U. Ekwueme

(57) ABSTRACT

Certain aspects of the present disclosure propose techniques for utilizing synchronization shift (SS) bits in Time Division Synchronous Code Division Multiple Access (TD-SCDMA) based uplink communications. The SS bits can be used for various purposes different from indicating timing of transmissions from a Node B to a user equipment.

32 Claims, 11 Drawing Sheets

(56) References Cited

OTHER PUBLICATIONS

Holma H., et al., "Physical Layer", Sep. 1, 2004, WCDMA for UMTS: Radio Access for Third Generation Mobile Communications, John Wiley & Sons, pp. 99-148, XP002493514, ISBN:978-0-470-87096-9.
International Search Report and Written Opinion—PCT/US2010/028190—ISA/EPO—Jan. 19, 2011.
Taiwan Search Report—TW099108584—TIPO—Feb. 18, 2013.

* cited by examiner

| Slot Format # | Spreading Factor | Midamble Length (chips) | $N_{TFCI}$ code word (bits) | $N_{SS}$ & $N_{TPC}$ (bits) | Bits/slot | $N_{Data/slot}$ (bits) | $N_{data/data\ field(1)}$ (bits) | $N_{data/data\ field(2)}$ (bits) |
|---|---|---|---|---|---|---|---|---|
| 0 | 16 | 144 | 0 | 0 & 0 | 88 | 88 | 44 | 44 |
| 1 | 16 | 144 | 4 | 0 & 0 | 88 | 86 | 42 | 44 |
| 2 | 16 | 144 | 8 | 0 & 0 | 88 | 84 | 42 | 42 |
| 3 | 16 | 144 | 16 | 0 & 0 | 88 | 80 | 40 | 40 |
| 4 | 16 | 144 | 32 | 0 & 0 | 88 | 72 | 36 | 36 |
| 5 | 16 | 144 | 0 | 2 & 2 | 88 | 84 | 44 | 40 |
| 6 | 16 | 144 | 4 | 2 & 2 | 88 | 82 | 42 | 40 |
| 7 | 16 | 144 | 8 | 2 & 2 | 88 | 80 | 42 | 38 |
| 8 | 16 | 144 | 16 | 2 & 2 | 88 | 76 | 40 | 36 |
| 9 | 16 | 144 | 32 | 2 & 2 | 88 | 68 | 36 | 32 |

FIG. 5

| Slot Format # | Spreading Factor | Midamble Length (chips) | $N_{TFCI}$ code word (bits) | $N_{TPC}$ (bits) | Bits/slot | $N_{Data/slot}$ (bits) | $N_{data/data\ field(1)}$ (bits) | $N_{data/data\ field(2)}$ (bits) |
|---|---|---|---|---|---|---|---|---|
| 0 | 16 | 144 | 0  | 0 | 88 | 88 | 44 | 44 |
| 1 | 16 | 144 | 4  | 0 | 88 | 86 | 44 | 42 |
| 2 | 16 | 144 | 8  | 0 | 88 | 84 | 42 | 42 |
| 3 | 16 | 144 | 16 | 0 | 88 | 80 | 40 | 40 |
| 4 | 16 | 144 | 32 | 0 | 88 | 72 | 36 | 36 |
| 5 | 16 | 144 | 0  | 2 | 88 | 86 | 44 | 42 |
| 6 | 16 | 144 | 4  | 2 | 88 | 84 | 42 | 42 |
| 7 | 16 | 144 | 8  | 2 | 88 | 82 | 42 | 40 |
| 8 | 16 | 144 | 16 | 2 | 88 | 78 | 40 | 38 |
| 9 | 16 | 144 | 32 | 2 | 88 | 70 | 36 | 34 |

FIG. 7

| Slot Format # | Spreading Factor | Midamble Length (chips) | $N_{TFCI}$ code word (bits) | $N_{TPC}$ (bits) | Bits/slot | $N_{Data/slot}$ (bits) | $N_{data/data\ field(1)}$ (bits) | $N_{data/data\ field(2)}$ (bits) |
|---|---|---|---|---|---|---|---|---|
| 0 | 16 | 144 | 0 | 0 | 88 | 88 | 44 | 44 |
| 1 | 16 | 144 | 4 | 0 | 88 | 86 | 42 | 44 |
| 2 | 16 | 144 | 8 | 0 | 88 | 84 | 42 | 42 |
| 3 | 16 | 144 | 16 | 0 | 88 | 80 | 40 | 40 |
| 4 | 16 | 144 | 32 | 0 | 88 | 72 | 36 | 36 |
| 5 | 16 | 144 | 0 | 4 | 88 | 84 | 44 | 40 |
| 6 | 16 | 144 | 4 | 4 | 88 | 82 | 42 | 40 |
| 7 | 16 | 144 | 8 | 4 | 88 | 80 | 42 | 38 |
| 8 | 16 | 144 | 16 | 4 | 88 | 76 | 40 | 36 |
| 9 | 16 | 144 | 32 | 4 | 88 | 68 | 36 | 32 |

METHOD AND APPARATUS OF UTILIZING UPLINK SYNCHRONIZATION SHIFT COMMAND BITS IN TD-SCDMA UPLINK TRANSMISSION

CROSS-REFERENCE TO RELATED APPLICATIONS

This application claims the benefit of U.S. Provisional Patent Application No. 61/265,514, entitled, "METHOD OF UTILIZING UPLINK SYNCHRONIZATION SHIFT COMMAND BITS IN TD-SCDMA UPLINK TRANSMISSION", filed on Dec. 1, 2009, which is expressly incorporated by reference herein in its entirety.

BACKGROUND

1. Field

Aspects of the present disclosure relate generally to wireless communications, and more particularly, to methods and apparatus of utilizing synchronization shift command bits of transmission frames in Time Division—Synchronous Code Division Multiple Access (TD-SCDMA) uplink communications.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UTMS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Downlink Packet Data (HSDPA), which provides higher data transfer speeds and capacity to associated UMTS networks.

As the demand for mobile broadband access continues to increase, research and development continue to advance the UMTS technologies not only to meet the growing demand for mobile broadband access, but also to advance and enhance the user experience with mobile communications.

SUMMARY

Certain aspects of the present disclosure provide a method of wireless communication. The method generally includes receiving, in at least one downlink time slot of a subframe, at least one uplink timing adjustment element indicating timing of uplink transmission, generating, in at least one uplink time slot of the subframe, at least one downlink timing adjustment element, at least one power control element and data, wherein the downlink timing adjustment element does not indicate timing of downlink transmission, and transmitting the at least one downlink timing adjustment element, the at least one power control element and the data.

Certain aspects of the present disclosure provide an apparatus for wireless communication. The apparatus generally includes at least one processor configured to receive, in at least one downlink time slot of a subframe, at least one uplink timing adjustment element indicating timing of uplink transmission, generate, in at least one uplink time slot of the subframe, at least one downlink timing adjustment element, at least one power control element and data, wherein the downlink timing adjustment element does not indicate timing of downlink transmission, and transmit the at least one downlink timing adjustment element, the at least one power control element and the data, and a memory coupled to the at least one processor.

Certain aspects of the present disclosure provide an apparatus for wireless communication. The apparatus generally includes means for receiving, in at least one downlink time slot of a subframe, at least one uplink timing adjustment element indicating timing of uplink transmission, means for generating, in at least one uplink time slot of the subframe, at least one downlink timing adjustment element, at least one power control element and data, wherein the downlink timing adjustment element does not indicate timing of downlink transmission, and means for transmitting the at least one downlink timing adjustment element, the at least one power control element and the data.

Certain aspects of the present disclosure provide a computer-program product for wireless communication comprising a computer readable medium having instructions stored thereon, the instructions being executable by one or more processors. The instructions generally include instructions for receiving, in at least one downlink time slot of a subframe, at least one uplink timing adjustment element indicating timing of uplink transmission, instructions for generating, in at least one uplink time slot of the subframe, at least one downlink timing adjustment element, at least one power control element and data, wherein the downlink timing adjustment element does not indicate timing of downlink transmission, and instructions for transmitting the at least one downlink timing adjustment element, the at least one power control element and the data.

Certain aspects of the present disclosure provide a method of wireless communication. The method generally includes transmitting, in at least one downlink time slot of a subframe, at least one uplink timing adjustment element indicating timing of uplink transmission, receiving, in at least one uplink time slot of the subframe, at least one downlink timing adjustment element, at least one power control element and data, wherein the downlink timing adjustment element does not indicate timing of downlink transmission, and processing the at least one downlink timing adjustment element, the at least one power control element and the data.

Certain aspects of the present disclosure provide an apparatus for wireless communication. The apparatus generally includes at least one processor configured to transmit, in at least one downlink time slot of a subframe, at least one uplink timing adjustment element indicating timing of uplink transmission, receive, in at least one uplink time slot of the subframe, at least one downlink timing adjustment element, at least one power control element and data, wherein the downlink timing adjustment element does not indicate timing of downlink transmission, and process the at least one downlink timing adjustment element, the at least one power control element and the data, and a memory coupled to the at least one processor.

Certain aspects of the present disclosure provide an apparatus for wireless communication. The apparatus generally includes means for transmitting, in at least one downlink time slot of a subframe, at least one uplink timing adjustment element indicating timing of uplink transmission, means for receiving, in at least one uplink time slot of the subframe, at least one downlink timing adjustment element, at least one power control element and data, wherein the downlink timing adjustment element does not indicate timing of downlink transmission, and means for processing the at least one downlink timing adjustment element, the at least one power control element and the data.

Certain aspects of the present disclosure provide a computer-program product for wireless communication comprising a computer readable medium having instructions stored thereon, the instructions being executable by one or more processors. The instructions generally include instructions for transmitting, in at least one downlink time slot of a subframe, at least one uplink timing adjustment element indicating timing of uplink transmission, instructions for receiving, in at least one uplink time slot of the subframe, at least one downlink timing adjustment element, at least one power control element and data, wherein the downlink timing adjustment element does not indicate timing of downlink transmission, and instructions for processing the at least one downlink timing adjustment element, the at least one power control element and the data.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 5 illustrates an example of bit allocation for different formats of time slots within a Time Division-Synchronous Code Division Multiple Access (TD-SCDMA) transmission frame in accordance with certain aspects of the present disclosure.

FIG. 7 illustrates an example of bit allocation for uplink TD-SCDMA time slots when synchronization shift (SS) command bits are used for transmitting data in accordance with certain aspects of the present disclosure.

FIG. 9 illustrates an example of bit allocation for the uplink TD-SCDMA time slots when the SS command bits are used for indicating to a Node B a downlink transmit power control in accordance with certain aspects of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
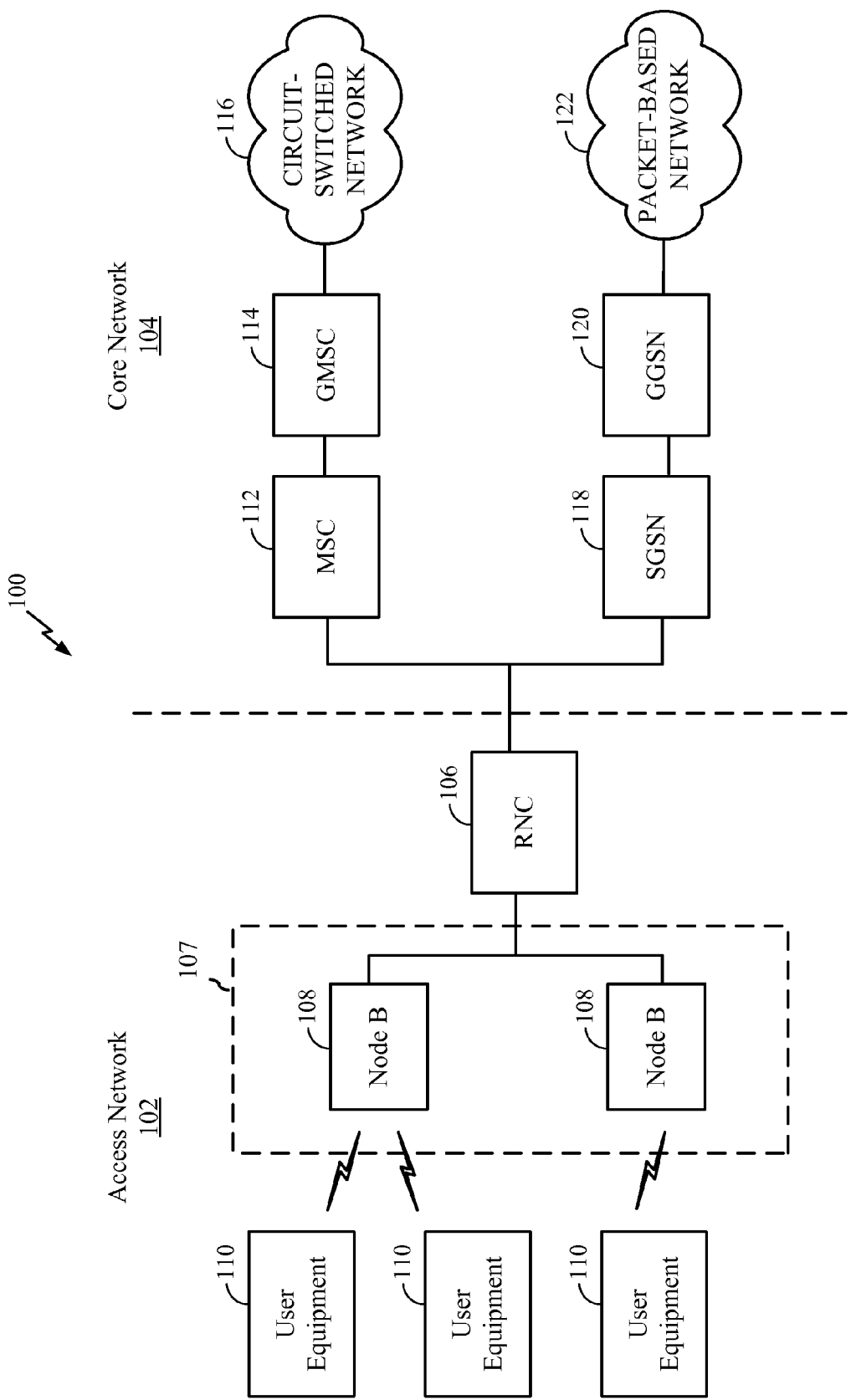
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two Node Bs 108 are shown; however, the RNS 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a smart-book, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the Node Bs 108. The downlink (DL), also called the forward link, refers to the communication link from a Node B to a UE, and the uplink (UL), also called the reverse link, refers to the communication link from a UE to a Node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has been subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a Node B 108 and a UE 110, but divides uplink and downlink transmissions into different time slots in the carrier.

Figure 2:
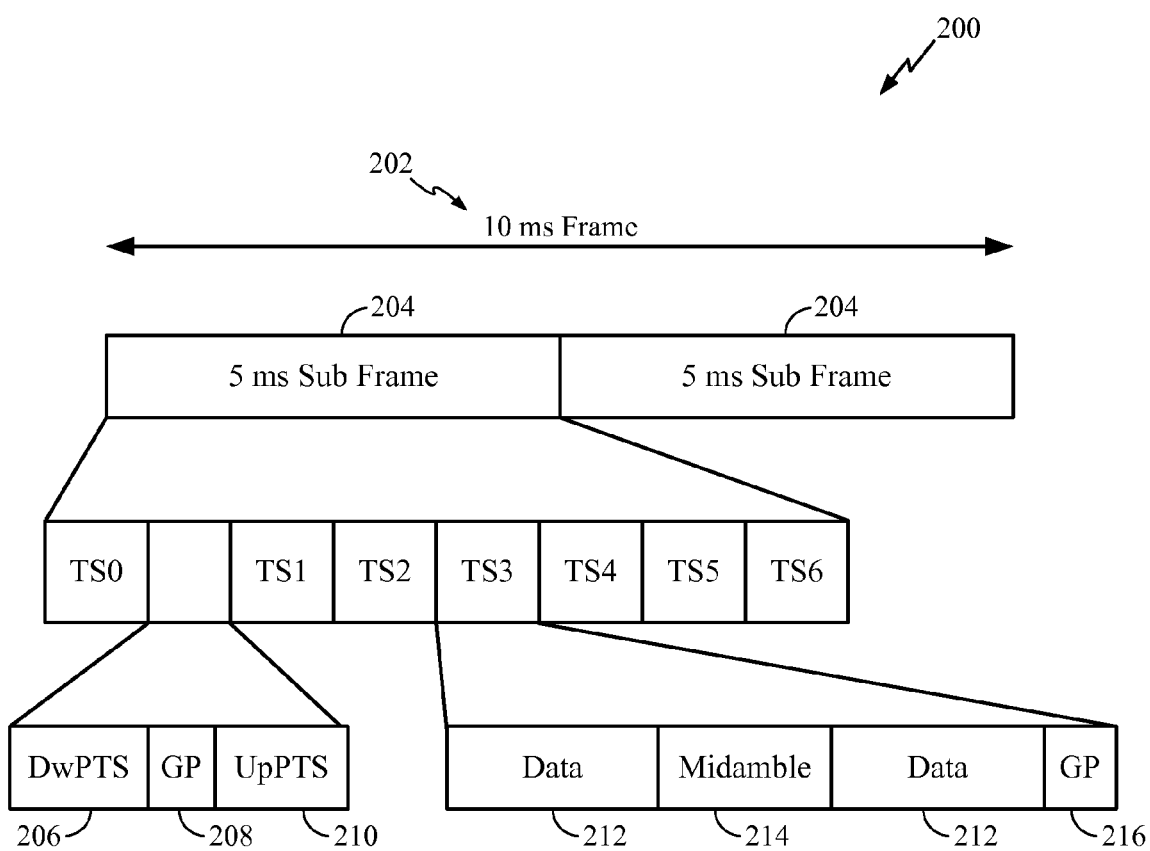
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 separated by a midamble 214 and followed by a guard period (GP) 216. The midamble 214 may be used for features, such as channel estimation, while the GP 216 may be used to avoid inter-burst interference.

Figure 3:
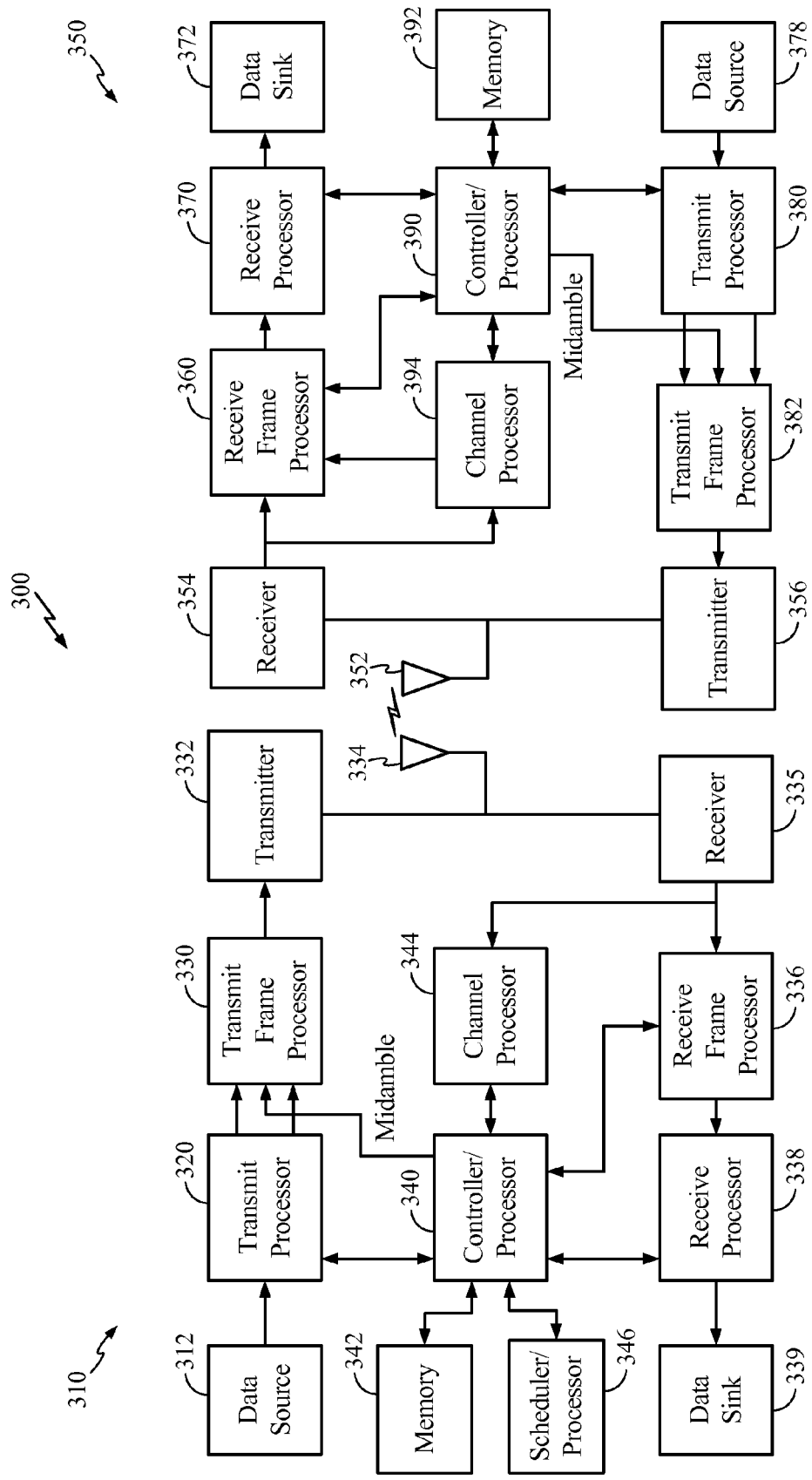
FIG. 3 is a block diagram conceptually illustrating an example of a Node B in communication with a user equipment (UE) in a telecommunications system.

FIG. 3 is a block diagram of a Node B 310 in communication with a UE 350 in a RAN 300, where the RAN 300 may be the RAN 102 in FIG. 1, the Node B 310 may be the Node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the Node B 310. More specifically, the receive processor 370 descrambles and despreads the symbols, and then determines the most likely signal constellation points transmitted by the Node B 310 based on the modulation scheme. These soft decisions may be based on channel estimates computed by the channel processor 394. The soft decisions are then decoded and deinterleaved to recover the data, control and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the Node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the Node B 310 or from feedback contained in the midamble transmitted by the Node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the Node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the Node B 310 and the UE 350, respectively. For example, the controller/processors 340 and 390 may provide various functions including timing, peripheral interfaces, voltage regulation, power management and other control functions. The computer readable media of memories 342 and 392 may store data and software for the Node B 310 and the UE 350, respectively. A scheduler/processor 346 at the Node B 310 may be used to allocate resources to the UEs and schedule downlink and/or uplink transmissions for the UEs.

Control Information of TD-SCDMA Frames

Figure 4:
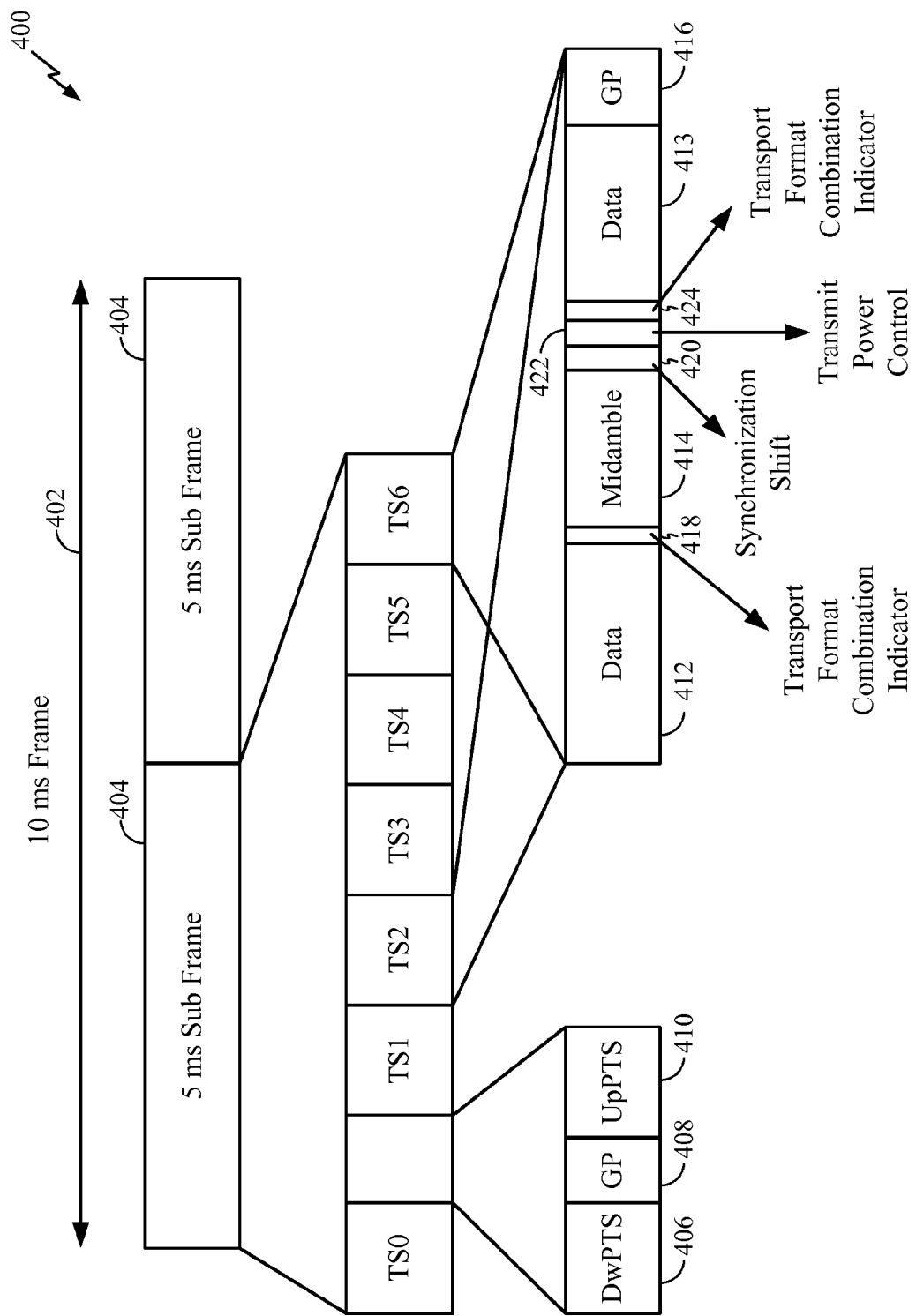
FIG. 4 is a block diagram conceptually illustrating an example of a frame structure with control information in transmission time slots in accordance with certain aspects of the present disclosure.

FIG. 4 is a block diagram 400 conceptually illustrating an example of a frame structure 402 with control information for Time Division-Synchronous Code Division Multiple Access (TD-SCDMA) communications in accordance with certain aspects of the present disclosure. The frame 402 may correspond to the frame 202 from FIG. 2 comprising two 5 ms subframes 404, wherein each of the subframes 404 may include seven time slots, TS0 through TS6. These time slots may be utilized for either uplink or downlink communications, as illustrated in FIG. 4. A downlink pilot time slot (DwPTS) 406, a guard period (GP) 408, and an uplink pilot time slot (UpPTS) 410 (which may be used to carry the uplink pilot channel (UpPCH)) may be located between TS0 and TS1.

Each downlink or uplink time slot may comprise, for example, 16 channelization codes. On each channelization code, the time slot may be structured as two data portions 412 and 413 each of, for example, 352 chips. These two data portions may be separated by a midamble 414 of 144 chips, and ending with a guard period 416 of 16 chips. The transmission chip rate may be approximately equal to 1.28 Mega chips per second. The data portion 413 may comprise Layer 1 control information including a Synchronization Shift (SS) command field 420, a Transmit Power Control (TPC) field 422 and a Transport Format Combination Indicator (TFCI) field 424. In addition, the data portion 412 may comprise a TFCI field 418 that precedes the midamble 414. As illustrated in FIG. 4, the SS and TPC fields may only appear in the second data portion 413 of the time slot.

The SS command bits 420 may indicate three possible cases in the uplink transmission timing: delayed, advanced, or "do nothing." When the value of SS command is, for example, "−1," then the transmit timing for an uplink time slot may be delayed by one timing adjustment step of k/8chips. When the value of SS command is "+1," then the transmit timing for the uplink time slot may be advanced by one timing adjustment step of k/8 chips. When the SS command is "0," then the transmit timing for the uplink time slot may not be changed (i.e., the "do nothing" case). The value of uplink synchronization step size k(k=1,2, . . . ,8) may be configured in downlink control messages, such as Radio Resource Control (RRC) messages.

The TPC field 422 of the time slot may indicate to a receiving node an increase or decrease of the node's transmit power. The TFCI fields 418 and 424 may indicate format of a Coded Composite Transport Channel (CCTrCH).

FIG. 5 illustrates an example of bit allocation for different formats of time slots within a Time Division-Synchronous Code Division Multiple Access (TD-SCDMA) transmission frame in accordance with certain aspects of the present disclosure. A voice service can be considered in which the spreading factor of 16 may be applied. It can be observed from FIG. 5 that the SS command bits may be allocated in both uplink and downlink time slots. However, a user equipment may not need to transmit the SS command bits to a Node B because downlink transmissions may be always synchronous to the Node B timing. The SS command bits are present in the uplink transmission only to provide the same format for both downlink and uplink TD-SCDMA transmissions.

Methods to Utilize Synchronization Shift Bits in Uplink Transmissions

Figure 6:
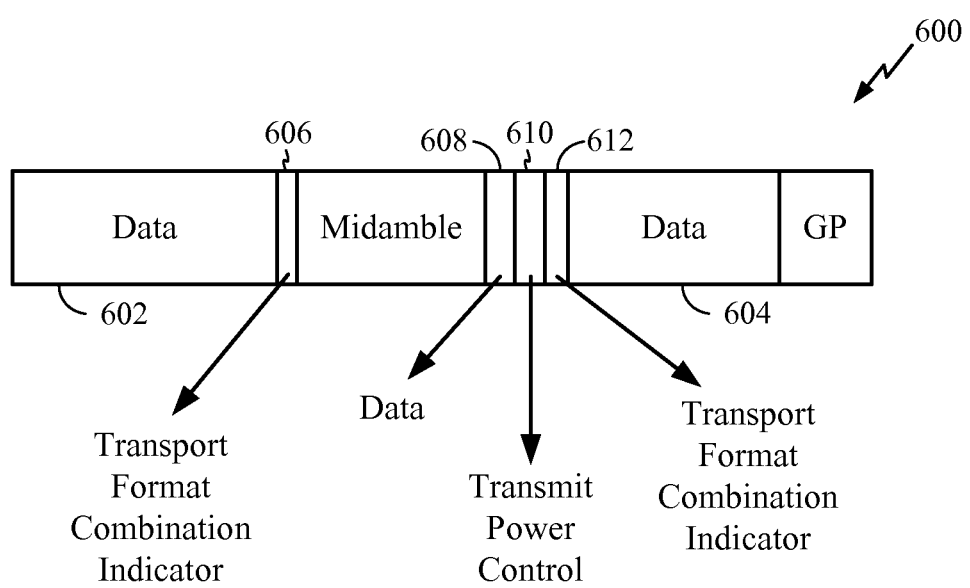
FIG. 6 is a block diagram conceptually illustrating an example format of a TD-SCDMA uplink time slot in accordance with certain aspects of the present disclosure.

Certain aspects of the present disclosure support utilizing SS command bits of an uplink time slot for various purposes other than for indicating timing of transmissions from a Node B to a user equipment (UE). In one aspect of the present disclosure, the SS command bits within the uplink time slots may be utilized for transmitting data from the UE to the Node B. As illustrated in FIG. 6, data bits may be placed in a SS command field 608 of a second data portion 604 of a TD-SCDMA uplink time slot 600 (a field 602 may represent the first data portion of the time slot 600). By employing this, bit locations of other Level 1 control information, such as the location of TPC field 610 and TFCI fields 606 and 612, may not be affected.

FIG. 7 illustrates an example of bit allocation for TD-SCDMA uplink time slots when the SS command bits are used for transmitting data in accordance with certain aspects of the present disclosure. The modified allocation of bits can be noted by observing a number of bits allocated for data in the second data portion 604 of the uplink time slot given in a column 704 of FIG. 7 and by comparing it with a corresponding column 504 of FIG. 5. It can be also observed from a column 702 in FIG. 7 that no bits in the uplink time slot may be allocated for synchronization. The benefit of the proposed approach is that the number of transmitted data bits may be increased by more than 2% on average.

Figure 8:
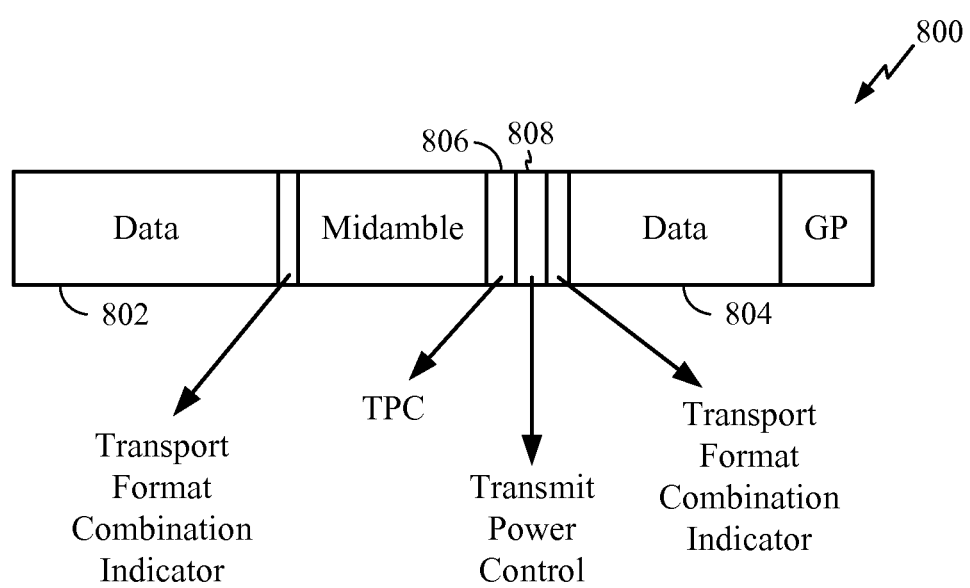
FIG. 8 is a block diagram conceptually illustrating another example format of the TD-SCDMA uplink time slot in accordance with certain aspects of the present disclosure.

In another aspect of the present disclosure, the SS command bits within the uplink time slots may be utilized for controlling a downlink transmit power at the Node B. As illustrated in FIG. 8, the content of original TPC field 808 may be copied into an SS field 806 of a second data portion 804 of a TD-SCDMA uplink time slot 800 (a field 802 may represent the first data portion of the time slot 800). By repeating the content of TPC, reliability of transmitting the TPC command may be improved. At the Node B, both the original TPC field 808 and newly allocated TPC bits 806 may be decoded and mutually compared in order to determine the accurate transmit power level.

FIG. 9 illustrates an example of bit allocation for the uplink TD-SCDMA time slots when the SS command bits are used for indicating to a Node B a downlink transmit power in accordance with certain aspects of the present disclosure. The modified allocation of bits can be noted by observing a number of bits within a time slot allocated for TPC given in a column 902 of FIG. 9 and by comparing it with a corresponding column 502 of FIG. 5. Further, it can be observed from a column 904 that the number of data bits may remain the same as in the example illustrated in FIG. 5 (see the column 504).

In yet another aspect of the present disclosure, the SS command bits within the uplink time slots may be again utilized for controlling the downlink transmission power at the Node B, but now the newly allocated TPC field may be coded to indicate boost up (scaling) of the original TPC. For example, if the newly allocated TPC comprises the value of "00" or "01," then the old TPC may indicate up/down of downlink transmission power with A dB, where the value of A may be specified by the old TPC field. If the newly allocated TPC bits are equal to "11" or "10," then this may indicate up/down of downlink transmission power by, for example, 2·A dB.

Alternatively, the two newly allocated TPC bits may be encoded such that the new TPC equal to "00" may indicate up/down of downlink transmission power of, for example, A dB. Further, the newly allocated TPC bits equal to "01" may indicate up/down of downlink transmission power of, for example, 2·A dB, the new TPC equal to "10" may indicate up/down of downlink transmission power of, for example, 3·A dB, and the new TPC equal to "11" may indicate up/down of downlink transmission power of, for example, 4·A dB.

Figure 10:
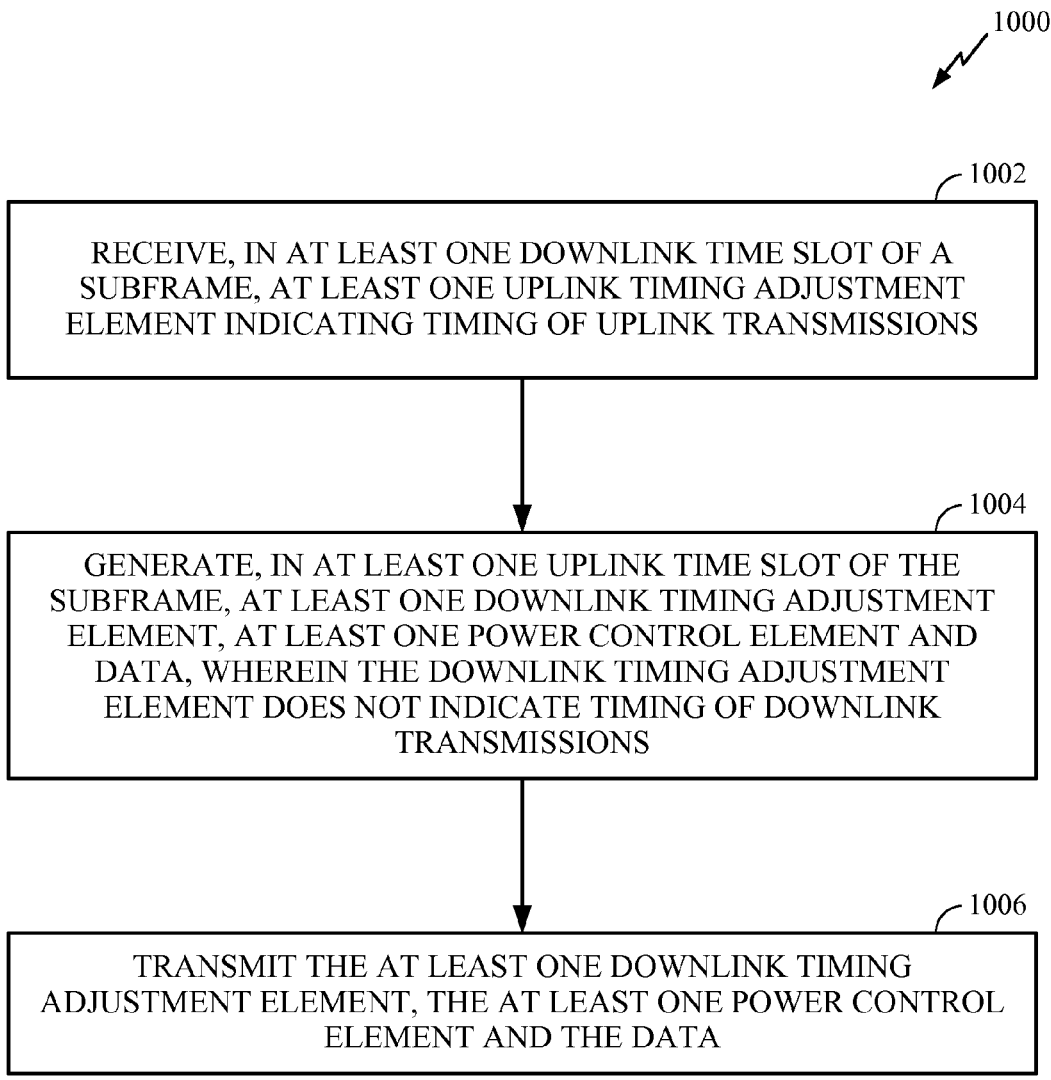
FIG. 10 is a functional block diagram conceptually illustrating example blocks executed at a user equipment to implement the functional characteristics of one aspect of the present disclosure.

FIG. 10 is a functional block diagram conceptually illustrating example blocks executed at a UE to implement the functional characteristics of one aspect of the present disclosure. Operations illustrated by the blocks 1000 may be executed, for example, by the processors 370 and 380 of the UE 350 from FIG. 3. In block 1002, the UE may receive, in at least one downlink time slot of a subframe, at least one uplink timing adjustment element indicating timing of uplink transmitting. In addition, in block 1004, in at least one uplink time slot of the subframe, at least one downlink timing adjustment element, at least one power control element and data may be generated, wherein the downlink timing adjustment element may not indicate timing of downlink transmission. Furthermore, in block 1006, the UE may transmit the at least one downlink timing adjustment element, the at least one power control element and the data.

Figure 11:
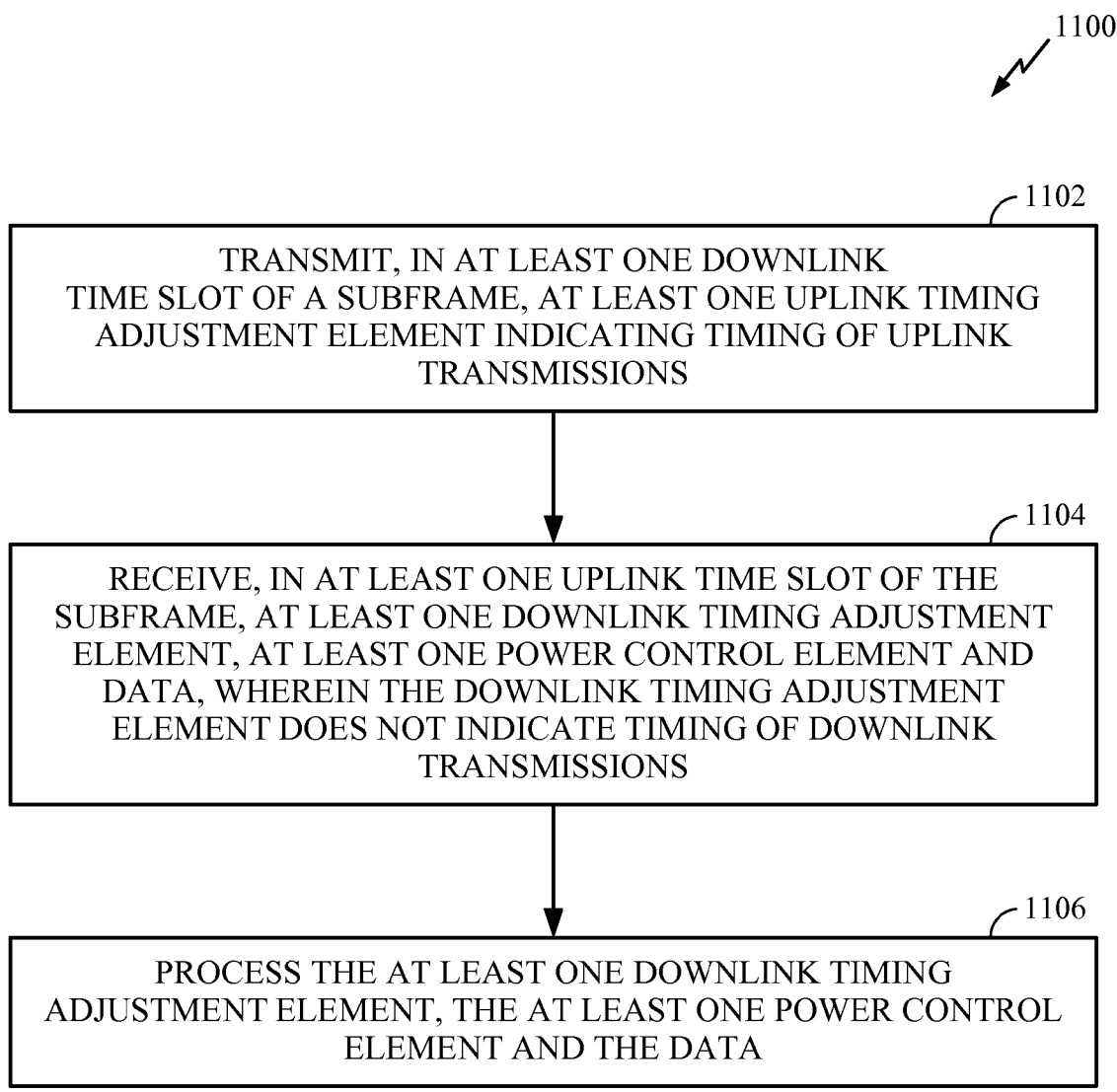
FIG. 11 is a functional block diagram conceptually illustrating example blocks executed at the Node B to implement the functional characteristics of one aspect of the present disclosure.

FIG. 11 is a functional block diagram conceptually illustrating example blocks executed at a Node B to implement the functional characteristics of one aspect of the present disclosure. Operations illustrated by the blocks 1100 may be executed, for example, by the processors 320 and 338 of the Node B 310 from FIG. 3. In block 1102, the Node B may transmit, in at least one downlink time slot of a subframe, at least one uplink timing adjustment element indicating timing of uplink transmission. In addition, in block 1104, the Node B may receive, in at least one uplink time slot of the subframe, at least one downlink timing adjustment element, at least one power control element and data, wherein the downlink timing adjustment element may not indicate timing of downlink transmission. Furthermore, in block 1106, the at least one downlink timing adjustment element, the at least one power control element and the data may be processed.

In one configuration, the apparatus 310 for wireless communication includes means for transmitting, in at least one downlink time slot of a subframe, at least one uplink timing adjustment element indicating timing of transmitting subframes from the apparatus 350 to the apparatus 310, means for receiving, in at least one uplink time slot of the subframe, at least one downlink timing adjustment element, at least one power control element and data, wherein the downlink timing adjustment element does not indicate timing of transmitting from the apparatus 310 to the apparatus 350 and means for processing the at least one downlink timing adjustment element, the at least one power control element and the data. In one configuration, the apparatus 350 for wireless communication includes means for receiving, in at least one downlink time slot of a subframe, at least one uplink timing adjustment element indicating timing of transmitting subframes from the apparatus 350 to the apparatus 310, means for generating, in at least one uplink time slot of the subframe, at least one downlink timing adjustment element, at least one power control element and data, wherein the downlink timing adjustment element does not indicate timing of transmitting from the apparatus 310 to the apparatus 350 and means for transmitting the at least one downlink timing adjustment element, the at least one power control element and the data to the apparatus 310. In one aspect, the aforementioned means may be the processors 320, 338, 370 and 380 configured to perform the functions recited by the aforementioned means. In another aspect, the aforementioned means may be a module or any apparatus configured to perform the functions recited by the aforementioned means.

Several aspects of a telecommunications system has been presented with reference to a TD-SCDMA system. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
receiving, in at least one downlink time slot of a subframe, at least one uplink timing adjustment element indicating timing of uplink transmission;
generating, in at least one uplink time slot of the subframe, at least a downlink timing adjustment element, a power control element, and data, the downlink timing adjustment element comprising an indication for adjusting power for downlink transmission such that the downlink timing adjustment element does not indicate timing of a downlink transmission; and
transmitting at least the downlink timing adjustment element, the power control element, and the data.

2. The method of claim 1, wherein the indication is copied in the downlink timing adjustment element from the power control element.

3. The method of claim 1, wherein:
the indication specifies whether to scale a value of the power; and
the value of power is specified in the power control element.

4. The method of claim 1, wherein:
the indication comprises a code; and
different values of the code map to different scalings of a value of the power, and wherein the value of the power is specified in the power control element.

5. An apparatus for wireless communication, comprising:
at least one processor configured to
receive, in at least one downlink time slot of a subframe, at least one uplink timing adjustment element indicating timing of uplink transmission,
generate, in at least one uplink time slot of the subframe, at least a downlink timing adjustment element, a power control element, and data, the downlink timing adjustment element comprising an indication for adjusting power for downlink transmission such that the downlink timing adjustment element does not indicate timing of a downlink transmission, and
transmit at least the downlink timing adjustment element, the power control element, and the data; and
a memory coupled to the at least one processor.

6. The apparatus of claim 5, wherein the indication is copied in the downlink timing adjustment element from the power control element.

7. The apparatus of claim 5, wherein:
the indication specifies whether to scale a value of the power; and
the value of power is specified in the power control element.

8. The apparatus of claim 5, wherein:
the indication comprises a code; and
different values of the code map to different scalings of a value of the power, and wherein the value of the power is specified in the power control element.

9. An apparatus for wireless communication, comprising:
means for receiving, in at least one downlink time slot of a subframe, at least one uplink timing adjustment element indicating timing of uplink transmission;
means for generating, in at least one uplink time slot of the subframe, at least a downlink timing adjustment element, a power control element, and data, the downlink timing adjustment element comprising an indication for adjusting power for downlink transmission such that the downlink timing adjustment element does not indicate timing of a downlink transmission; and
means for transmitting at least the downlink timing adjustment element, the power control element, and the data.

10. The apparatus of claim 9, wherein the indication is copied in the downlink timing adjustment element from the power control element.

11. The apparatus of claim 9, wherein:
the indication specifies whether to scale a value of the power; and
the value of power is specified in the power control element.

12. The apparatus of claim 9, wherein:
the indication comprises a code; and
different values of the code map to different scalings of a value of the power, and wherein the value of the power is specified in the power control element.

13. A computer-program product for wireless communication, comprising a non-transitory computer readable medium having instructions stored thereon, the instructions being executable by one or more processors and the instructions comprising:
instructions for receiving, in at least one downlink time slot of a subframe, at least one uplink timing adjustment element indicating timing of uplink transmission;
instructions for generating, in at least one uplink time slot of the subframe, at least a downlink timing adjustment element, a power control element, and data, wherein the downlink timing adjustment element comprising an indication for adjusting power for downlink transmission such that the downlink timing adjustment element does not indicate timing of a downlink transmission; and
instructions for transmitting at least the downlink timing adjustment element, the power control element, and the data.

14. The computer-program product of claim 13, wherein the indication is copied in the downlink timing adjustment element from the power control element.

15. The computer-program product of claim 13, wherein:
the indication specifies whether to scale a value of the power; and
the value of power is specified in the power control element.

16. The computer-program product of claim 13, wherein:
the indication comprises a code; and
different values of the code map to different scalings of a value of the power, and wherein the value of the power is specified in the power control element.

17. A method of wireless communication, comprising:
transmitting, in at least one downlink time slot of a subframe, at least one uplink timing adjustment element indicating timing of uplink transmission;
receiving, in at least one uplink time slot of the subframe, at least a downlink timing adjustment element, a power control element, and data, the downlink timing adjustment element comprising an indication for adjusting power for downlink transmission such that the downlink timing adjustment element does not indicate timing of a downlink transmission; and
processing at least the downlink timing adjustment element, the power control element, and the data.

18. The method of claim 17, wherein the processing comprises:
decoding the downlink timing adjustment element; and
comparing the decoded downlink timing adjustment element with the power control element to determine the power for downlink transmission.

19. The method of claim 17, wherein the processing comprises decoding the downlink timing adjustment element to determine whether to scale a value of the power, and wherein the value of the power is specified in the power control element.

20. The method of claim 17, wherein processing comprises decoding the downlink timing adjustment element to determine a factor for scaling a value of the power, and wherein the value of the power is specified in the power control element.

21. An apparatus for wireless communication, comprising:
at least one processor configured to
transmit, in at least one downlink time slot of a subframe, at least one uplink timing adjustment element indicating timing of uplink transmission,
receive, in at least one uplink time slot of the subframe, at least a downlink timing adjustment element, a power control element, and data, the downlink timing adjustment element comprising an indication for adjusting power for downlink transmission such that the downlink timing adjustment element does not indicate timing of a downlink transmission, and
process at least the downlink timing adjustment element, the power control element, and the data; and
a memory coupled to the at least one processor.

22. The apparatus of claim 21, wherein the processor is further configured to:
decode the downlink timing adjustment element, and
compare the decoded downlink timing adjustment element with the power control element to determine the power for downlink transmission.

23. The apparatus of claim 21, wherein the processor is further configured to decode the downlink timing adjustment element to determine whether to scale a value of the power, and wherein the value of the power is specified in the power control element.

24. The apparatus of claim 21, wherein the processor is further configured to decode the downlink timing adjustment element to determine a factor for scaling a value of the power, and wherein the value of the power is specified in the power control element.

25. An apparatus for wireless communication, comprising:
  means for transmitting, in at least one downlink time slot of a subframe, at least one uplink timing adjustment element indicating timing of uplink transmission;
  means for receiving, in at least one uplink time slot of the subframe, at least a downlink timing adjustment element, a power control element, and data, the downlink timing adjustment element comprising an indication for adjusting power for downlink transmission such that the downlink timing adjustment element does not indicate timing of a downlink transmission; and
  means for processing at least the downlink timing adjustment element, the power control element, and the data.

26. The apparatus of claim 25, wherein the means for processing comprises:
  means for decoding the downlink timing adjustment element; and
  means for comparing the decoded downlink timing adjustment element with the power control element to determine the power for downlink transmission.

27. The apparatus of claim 25, wherein the means for processing comprises means for decoding the downlink timing adjustment element to determine whether to scale a value of the power, and wherein the value of the power is specified in the power control element.

28. The apparatus of claim 25, wherein the means for processing comprises means for decoding the downlink timing adjustment element to determine a factor for scaling a value of the power, and wherein the value of the power is specified in the power control element.

29. A computer-program product for wireless communication, comprising a non-transitory computer readable medium having instructions stored thereon, the instructions being executable by one or more processors and the instructions comprising:
  instructions for transmitting, in at least one downlink time slot of a subframe, at least one uplink timing adjustment element indicating timing of uplink transmission;
  instructions for receiving, in at least one uplink time slot of the subframe, at least a downlink timing adjustment element, a power control element, and data, the downlink timing adjustment element comprising an indication for adjusting power for downlink transmission such that the downlink timing adjustment element does not indicate timing of a downlink transmission; and
  instructions for processing at least the downlink timing adjustment element, the power control element, and the data.

30. The computer-program product of claim 29, wherein the instructions further comprise:
  instructions for decoding the downlink timing adjustment element; and
  instructions for comparing the decoded downlink timing adjustment element with the power control element to determine the power for downlink transmission.

31. The computer-program product of claim 29, wherein the instructions further comprise instructions for decoding the downlink timing adjustment element to determine whether to scale a value of the power, and wherein the value of the power is specified in the power control element.

32. The computer-program product of claim 29, wherein the instructions further comprise instructions for decoding the downlink timing adjustment element to determine a factor for scaling a value of the power, and wherein the value of the power is specified in the power control element.

* * * * *